United States Patent [19]

Takayama

[11] Patent Number: 4,644,413
[45] Date of Patent: Feb. 17, 1987

[54] AUTOMATIC TRACKING CONTROL DEVICE

[75] Inventor: Nobutoshi Takayama, Kanagawa, Japan

[73] Assignee: Canon Kabushiki Kaisha, Tokyo, Japan

[21] Appl. No.: 617,799

[22] Filed: Jun. 6, 1984

[30] Foreign Application Priority Data

Jun. 10, 1983 [JP] Japan .................................. 58-103734

[51] Int. Cl.⁴ .............................................. G11B 5/56
[52] U.S. Cl. ..................................... 360/10.2; 360/77
[58] Field of Search .................... 360/77, 73, 70, 10.2, 360/10.3

[56] References Cited

U.S. PATENT DOCUMENTS 4,364,097 12/1982 De Boer et al. ....................... 360/70
4,433,350 2/1984 Tsuruta ................................. 360/70
4,497,000 1/1985 Terada et al. ......................... 360/70

Primary Examiner—George G. Stellar
Attorney, Agent, or Firm—Toren, McGeady and Goldberg

[57] ABSTRACT

In the disclosed automatic tracking control device, a moving element in a VTR laterally moves a pick-up head relative to a recording track on a recording medium. A first control circuit produces a control signal for controlling the moving element to cause the head to trace recording tracks on the recording medium, and a sampling circuit samples the control signal produced by the first control circuit at times approximately corresponding to the mid-point of the movement of the lateral head. A second control controls a drive for driving the recording medium on the basis of the signal sampled by the sampling circuit.

10 Claims, 3 Drawing Figures

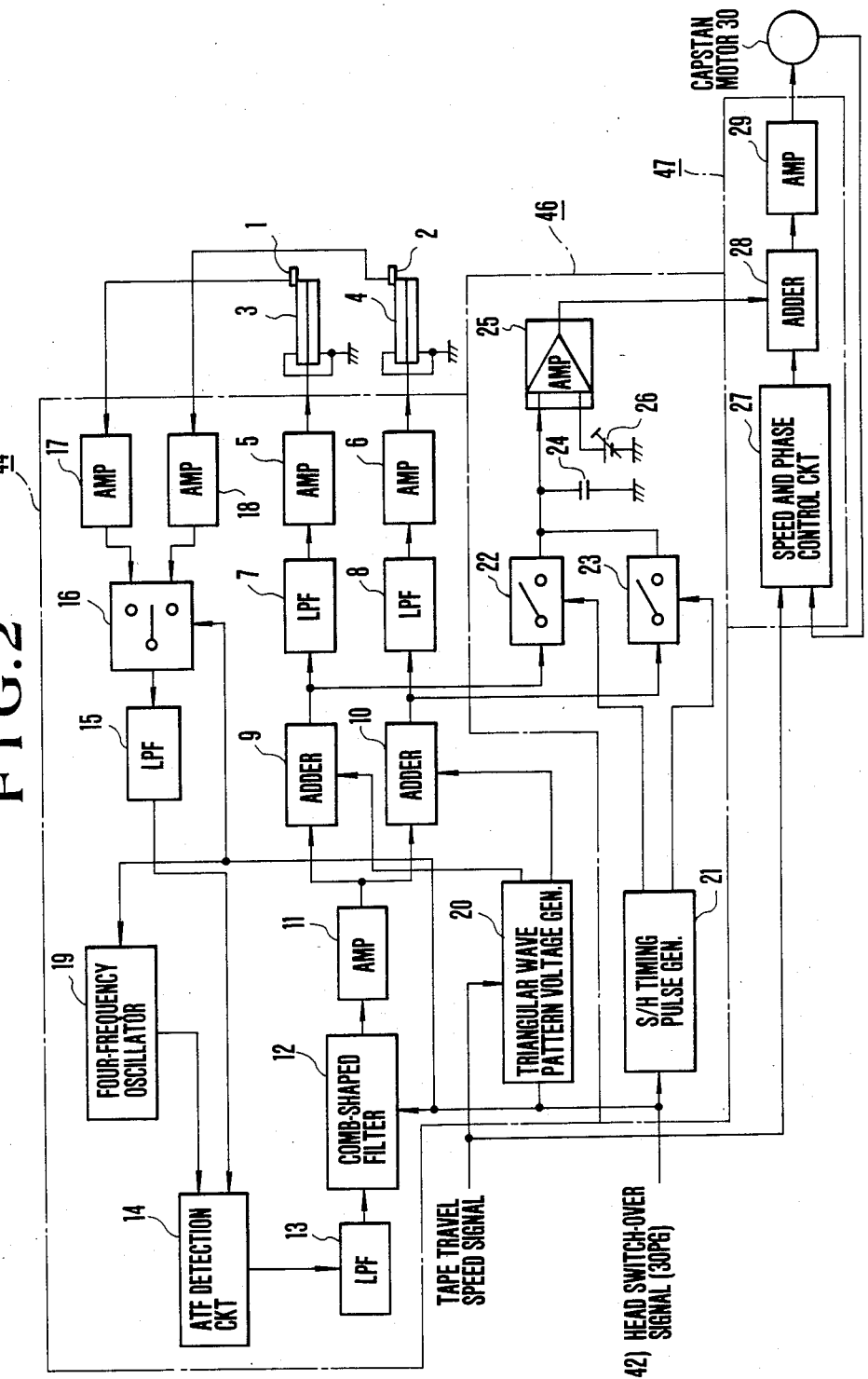

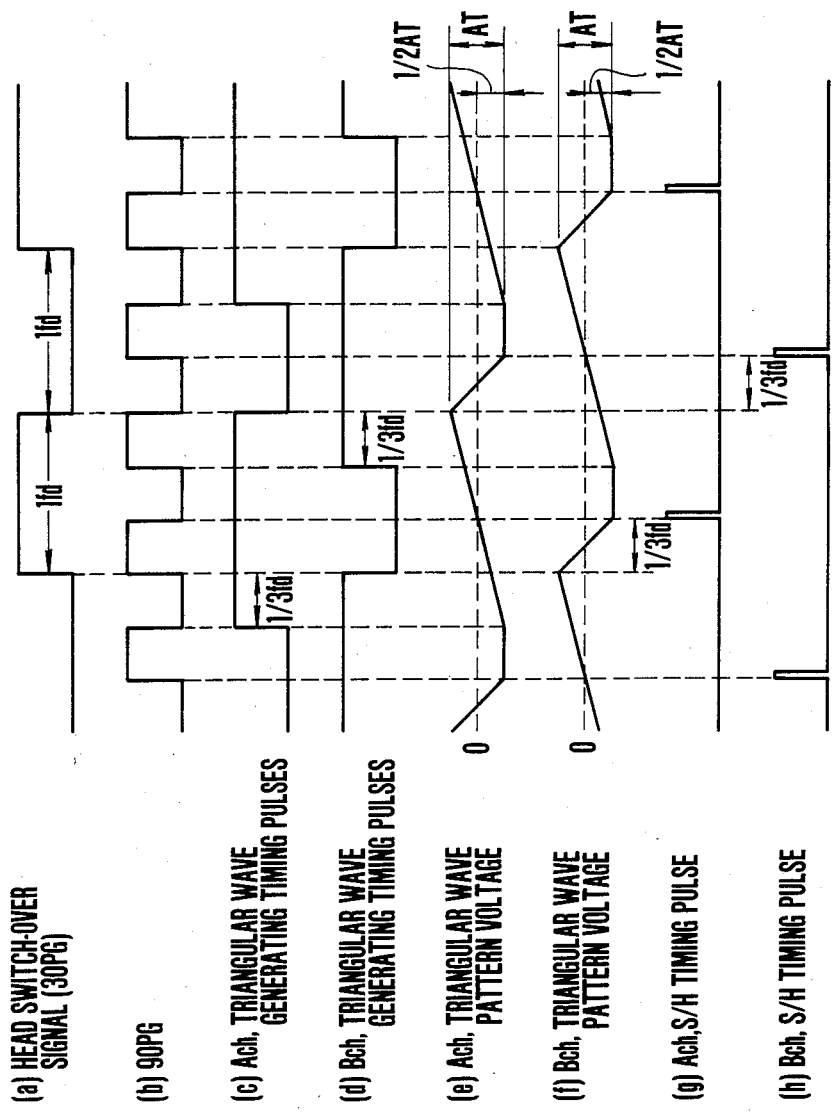

AUTOMATIC TRACKING CONTROL DEVICE

BACKGROUND OF THE INVENTION

1. Field of the Invention

This invention relates to an automatic tracking control device and more particularly to a tracking control device suited for a recording/reproducing apparatus such as a helical scanning type video tape recording/reproducing apparatus (hereinafter called a VTR) in which a moving element laterally moves a reproducing head relative to a recording track formed on a recording medium and a control circuit controls the moving element to cause the head to trace recording tracks on the recording medium.

2. Description of the Prior Art

Various types of automatic tracking control devices of the above-stated type have been proposed. Some of these devices have already been put to practical use in VTR's.

In an automatic tracking control device of this type, an electro-mechanical transducer element such as a bimorph plate or the like using a piezo-electric or electrostriction element (hereinafter called an actuator) has been employed as the above-stated moving element. Generally, it is desirable to reduce the range over which the actuator must move the head while the head's tracking of the recording tracks remains satisfactory. A proposed method for accomplishing this involves controlling the rotation of a capstan with a signal obtained by integrating a drive voltage signal applied to the actuator. According to this method, the mean value of the drive voltage applied to the actuator can be brought closer to zero and the degree of deflection of the actuator, i.e., the head's moving range, can be decreased. This method is quite advantageous because the residual distortion of the actuator can be reduced and the adverse effect of the non-linearity of the actuator can be avoided.

However, there are other important factors that must also be taken into consideration including the touch characteristic between the reproducing head and the recording tape and a tracking characteristic relative to the disturbance of the tape travel load. Therefore, the prior art methods of controlling the rotation of the capstan with a signal obtained by integrating the control voltage applied to the actuator require a large integration time constant. This results in a low response speed for capstan control and this has presented a problem in that respect.

There exist special reproducing modes in which a recorded signal is reproduced at a tape travel speed different from the recording speed, such as fast forward/backward reproducing (searching), slow reproduction, etc. In those modes it is possible to reproduce the recording without a noise bar in the reproduced picture by adding a voltage of a triangular wave form, one which corresponds to the tape travel speed, to a tracking signal when scanning the tape surface with the reproducing head before the tracking signal is applied to the actuator. In this instance, however, the actuator is required to move the head over a much greater range than in a normal reproducing operation. Depending on the reproducing tape travel speed, the head moving range extends from scores of microns to several hundred microns. Therefore, this method has presented a problem with respect to the build-up characteristic of the tracking operation during switch-over from one tape travel speed to another.

SUMMARY OF THE INVENTION

It is therefore an object of this invention to provide a novel automatic tracking control device or a recorded signal reproducing apparatus equipped with the tracking control device which is capable of eliminating the above-stated shortcomings of the prior art devices.

It is another object of the invention to provide an automatic tracking control device or a recorded signal reproducing apparatus equipped with the tracking control device which, in causing a reproducing head to trace the recording tracks of the recording medium under a combination of control over moving means for laterally moving a reproducing head relative to a recording track on a recording medium and control over driving means for driving the recording medium, is capable of increasing the response speed of the control over the driving means.

It is a further object of the invention to provide an automatic tracking control device or a recorded signal reproducing apparatus equipped with the tracking control device which is arranged to improve the building up characteristic of the tracking operation in the event of a shift of the speed at which the recording medium is driven.

It is a still further object of the invention to provide a novel automatic tracking control device or a recorded signal reproducing apparatus equipped with the tracking control device wherein, in case that an electro-striction element is employed as the above-stated moving means, not only the building-up characteristic of the tracking operation is improved but also the residual distortion of the moving means is lessened; the adverse effect of nonlinearity is eliminated; and the service life of the moving means can be lengthened.

Under these objects and according to a preferred embodiment embodying an aspect of the present invention, an automatic tracking control device for controlling the tracking of reproducing head means relative to an elongated signal track of a record bearing medium driven by drive means relative to the head means, comprises moving means for moving the head means in directions lateral to the elongated signal track of the medium, first control means for controlling the moving means with a first control signal to cause the head means to trace the track of the medium, signal forming means for forming a second control signal on the basis of the first control signal almost corresponding to a neutral position in a range of movement of the head means moved by the moving means, and second control means for controlling the drive means with the second control signal formed by the signal forming means.

The signal forming means includes, for example, a sampling and holding circuit for sampling and holding the first control signal and a sampling control circuit for causing the sampling and holding circuit to sample and hold the first control signal at a timing almost corresponding to the neutral position in the movement range of the head means when the head means is moved by the moving means over the range.

These and further objects and features of the invention will become apparent from the following detailed description of a preferred embodiment thereof taken in connection with the accompanying drawings.

BRIEF DESCRIPTION OF THE DRAWINGS

A preferred embodiment of this invention is arranged as shown in the accompanying drawings, wherein:

FIG. 2 is a block diagram showing a specific circuit arrangement of the embodiment shown in FIG. 1.

FIG. 3 is a timing chart showing inputs and outputs of the essential circuit elements included in the circuit arrangement shown in FIG. 2.

DETAILED DESCRIPTION OF THE PREFERRED EMBODIMENT

Figure 1:
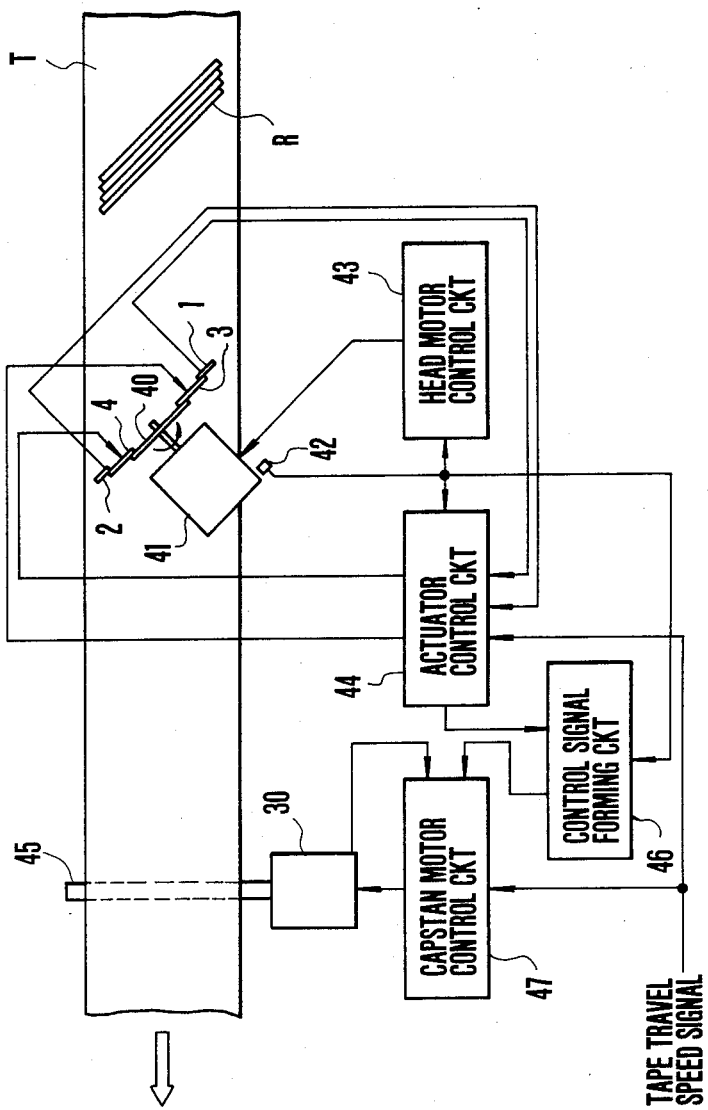
FIG. 1 is a schematic illustration showing an outline of the arrangement of the embodiment in which the invention is applied to a helical scanning type VTR.

In FIG. 1 which shows the outline of a preferred embodiment of the invention, the illustration includes a magnetic tape T having obliquely elongated signal recording tracks R formed thereon; and reproducing magnetic heads 1 and 2 which are opposed to each other at an angle of 180 degrees. Each of the reproducing magnetic heads 1 and 2 is mounted on the free end of a bimorph plate electro-mechanical transducer element 3 or 4 such as a laminated type piezoelectric or electro-striction element which is employed as moving means (hereinafter called the actuator). The actuators 3 and 4 are respectively mounted on a rotating member 40 at their tail ends. The rotating member 40 is rotated by a head rotating motor 41 in the direction of arrow as shown in the drawing. Although it is not shown in the drawing, the heads 1 and 2 are arranged to be rotated protruding out of a slit provided between a pair of tape guide drums in a known manner. The tape T is obliquely wound at least 180 degrees around this pair of tape guide drums. A rotation phase detector 42 is arranged to detect the rotation phase of the heads 1 and 2 and to produce a signal. The signal from the phase detector 42 is used as a head switch-over signal (hereinafter will sometimes be called the 30 PG signal) and is supplied to a head motor control circuit 43. The control circuit 43 is arranged to control the head rotating motor 41 on the basis of the output of the phase detector 42 in such a way as to cause the heads 1 and 2 to be rotated at a predetermined phase and a predetermined number of revolutions, which corresponds to the TV frame rate. An actuator control circuit 44 is arranged to serve as first control means for controlling the actuators 3 and 4 to cause the heads 1 and 2 to properly trace the recording tracks R of the tape T according to tracking pilot signals included in a signal picked up from the tracks R of the tape T, the 30 PG signal produced from the phase detector 42 and a tape travel speed signal. Further details of the actuator control circuit 44 will be described later with reference to FIG. 2. A capstan 45 cooperates with a pinch roller (not shown) for driving the tape T to move it in the longitudinal direction thereof or in the direction of arrow as shown in the drawing. A capstan motor 30 rotates the capstan 45. A control signal forming circuit 46 is arranged to produce a control signal for additionally controlling the rotation of the capstan according to the output of the actuator control circuit 44 and the 30 PG signal produced from the detector 42. A capstan motor control circuit 47 is arranged to serve as second control means to control the capstan motor 30 on the basis of a frequency signal (FG signal) obtained from the capstan motor 30 according to the number of revolution of the motor 30, the control signal from the control signal forming circuit 46 and the tape travel speed signal.

Referring now to FIG. 2, the details of the actuator control circuit 44, the control signal forming circuit 46 and the capstan motor control circuit 47 are as follows:

The actuator control circuit 44 includes amplifiers 5 and 6 which are arranged to generate high voltages for driving the actuators 3 and 4; low-pass filters 7 and 8 which are arranged to attenuate beforehand the high frequency component of the actuator control signal for the purpose of lowering the mechanical resonance of the actuators 3 and 4; and adders 9 and 10 which are arranged as follows: During the period of tracing the recording tracks R on the tape T by the heads 1 and 2, the tracking conditions of these heads 1 and 2 are controlled by a signal (hereinafter will be called the ATF signal) which will be described later herein. In the event of special reproduction such as slow reproduction, still picture reproduction, fast reproduction in the forward or backward direction, etc. in which a recorded signal is to be reproduced at a tape running speed differing from the tape speed employed at the time of recording, a triangular wave pattern voltage generated by a triangular wave pattern voltage generator 20 on the basis of the 30 PG signal of the phase detector 42 according to the tape travel speed of the special reproduction mode is added to the ATF signal by means of these adders 9 and 10 for the purpose of obtaining a reproduced picture free from any noise bar. An amplifier 11 is arranged to determine the ratio of the ATF signal to the triangular wave pattern voltage. A low-pass filter 13 is provided for the purpose of improving the S/N ratio of the ATF signal by taking out only the low frequency component thereof. A comb-shaped filter 12 is provided also for the purpose of improving the S/N ratio of the ATF signal by taking out only the frequency components having frequencies integer multiplies of the field frequency. A detection circuit 14 is arranged to detect the ATF signal. Many methods have been proposed for generating the ATF signal. Some of them have already been put to use for VTR's. In the case of this embodiment, pilot signals of four different frequencies f1-f4 are recorded in four adjacent tracks respectively at the time of recording a video signal. In reproducing the video signal, the amounts of cross-talk components from two tracks adjoining the track being reproduced by the heads 1 and 2 are detected and compared in accordance with the so-called four-frequency pilot signal method is employed. Amplifiers 17 and 18 are arranged to amplify the outputs of the heads 1 and 2. A switch 16 is arranged to select the head 1 or 2 on the basis of the 30 PG signal from the phase detector 42 only when the head is scanning the recording track R of the tape T. A low-pass filter 15 is arranged to remove a video signal from a reproduced RF output obtained and to allow only the ATF pilot signals f1-f4 to pass therethrough. An oscillator 19 is arranged to produce four frequency reference signals (F1-F4=f1-f4). The actuator control circuit 44 is arranged in this manner.

In the control signal forming circuit 46, a timing pulse generator 21 is arranged to produce timing pulses in association with the head switch-over signal (30 PG signal) for the purpose of determining timing for sampling-and-holding the signals produced from the adders 9 and 10 which are included in the actuator control circuit 44. Analog switches 22 and 23 are arranged to be turned on by the timing pulses and to allow a holding capacitor 24 to alternately hold the outputs of the adders 9 and 10. A gain adjusting differential amplifier 25 is arranged to adjust the level of the signal held at the capacitor 24 before it is added to a capstan motor speed control loop. A reference voltage source 26 is arranged to determine the DC level of the gain adjusting differential amplifier 25. The control signal forming circuit 46 is arranged in this manner.

The arrangement of the capstan motor control circuit 47 is as follows: The circuit 47 includes a capstan motor driving amplifier 29 and an adder 28. The output (a phase control signal) of the differential amplifier 25 of the control signal forming circuit 46 and the output of a speed and phase control circuit 27 which is responsive to the tape travel speed signal are added together by the adder 28 to obtain a rotation control signal.

The automatic tracking control device which is arranged as described above operates as follows: Assuming that the VTR is set in a special reproducing mode in which reproduction is to be performed at a tape travel speed five times as fast as the normal reproducing speed which is the same as the recording speed. FIG. 3 shows the input and output wave forms of the essential parts of the circuit arrangement shown in FIG. 2 when they are in this special reproduction mode. Here, of the heads 1 and 2, the head 1 is assumed to produce a reproduction output by scanning the surface of the tape T during a period for which the head switch-over signal (30 PG as shown in FIG. 3(a)) is at a high level and this period is assumed to be a period Ach. The other head 2 is assumed to produce a reproduction output by scanning the surface of the tape T during a period for which the head switch-over signal (30 PG) is at a low level and that period is assumed to be a period Bch. The ATF detection circuit 14 produces an ATF signal for controlling the tracking condition of the head 1 during the period Ach and another ATF signal for controlling that of the head 2 during the period Bch. These signals are applied via the routes as shown in FIG. 2 to the actuators 3 and 4 which are carrying the heads 1 and 2. Each of the heads 1 and 2 is thus moved perpendicularly to the rotating direction thereof, i.e. laterally relative to the track R of the tape T in such a way as to keep it in a proper tracking condition. Meanwhile, the triangular wave pattern voltage generator 20 produces a triangular wave-form voltage corresponding to a voltage required for moving the heads 1 and 2 to an extent the maximum amplitude of which is about five times as much as the width of the track. This output of the generator 20 is added to the ATF signals at the adders 9 and 10. The wave form and timing of this triangular wave form pattern voltage are as shown in FIGS. 3(e) and 3(f). The generating timing of the triangular wave (e) of the period Ach and that of the triangular wave (f) of the period Bch to be produced from the triangular wave pattern voltage generator 20 are arranged as follows: In synchronism with the head switch-over signal (30 PG), a pulse signal (hereinafter will be called 90 PG pulse signal) of frequency three times as high as the head switch-over signal is generated beforehand. Then, triangular wave generating timing pulses are obtained as shown in FIGS. 3(c) and 3(d) from this 90 PG pulse signal and the head switch-over signal (30 PG). The rising point of each of the triangular waves (e) and (f) is arranged to be earlier by ⅓ of one field period (1 fd) than the point of time at which scanning the recording track on the tape T by the head 1 or 2 begins. This arrangement results from consideration of an adverse effect of time delay which will be caused by the low-pass filters 7 and 8.

The tracking by the heads 1 and 2 in the special reproduction mode is carried out with the actuators 3 and 4 controlled in the manner as described above. In this instance, the deflection degree of the actuators 3 and 4 is limited. In order to enable the heads 1 and 2 to satisfactorily perform the tracking operation on the recording track R, the phase of the tape T relative to the heads 1 and 2 must be so controlled that the deflection degree of the actuators 3 and 4 does not have to be large. In the case of this specific embodiment, therefore, the timing pulse generator 21 of the control signal forming circuit 46 of FIG. 2 is arranged to produce sampling timing pulses as shown in FIGS. 3(g) and 3(h) in association with the head switch-over signal (30 PG). Then, with these timing pulses (g) and (h) used, the analog switches 22 and 23 are operated to have the actuator control signals alternately held at the capacitor 24. The differential amplifier 25 is arranged to obtain a difference voltage between the output voltage of the capacitor 24 and the reference voltage preset by the reference voltage source 26. The difference voltage thus obtained is added via the adder 28 to the control loop of the control circuit 47 provided for the capstan motor 30. Then, the phase of the capstan 45 is so controlled as to make the deflection degree of the actuators 3 and 4 substantially zero at the time of sampling. The timing for the sampling pulses (g) and (h) of the periods Ach and Bch is arranged to be later by ⅓ of one field period (1 fd) than the beginning of each scanning field period. This is because, at this point of time, the deflection degree of each of the actuators 3 and 4 substantially corresponds to ½ of a total deflection degree, i.e. the maximum amplitude AT. In other words, the timing of the sampling pulses (g) and (h) is arranged to be substantially corresponding to a mid-point or a neutral point within the moving range of each of the heads 1 and 2. The arrangement reduces the required deflection degree to ½ AT in the positive and negative directions and thus effectively lessens residual distortion to eliminate any adverse effect of non-linearity. Besides, the service life of these actuators can be lengthened by this arrangement.

With the capstan controlled in the above-stated manner, the maximum deflection degree of the actuators 3 and 4 can be minimized while the heads 1 and 2 are kept in a proper tracking condition.

In this specific embodiment, the timing of the sampling pulses (see FIGS. 3(g) and 3(h)) is arranged to be a point after the lapse of ⅓ of the field period (1 fd) from the rise of each scanning field. However, this timing can be determined as desired. Further, it is not always necessary to sample and hold both of the actuator control signals but it is possible to sample and hold only one of them.

Further, in the embodiment described above, the operation for fast reproduction in which the signal recorded on the tape T is to be reproduced at a tape travel speed five times as fast as the speed at which the signal is recorded is described by way of example. However, the same advantageous effect is attainable for slow reproduction which is to be carried out at a tape travel speed lower than the recording speed and for still picture reproduction which is to be carried out with the tape kept in repose. In accordance with the invention, an automatic tracking control device of the kind having the head automatically perform a tracking operation on the recording tracks of a recording medium under a combination of control over the lateral move of the head relative to the recording track and control over the driving means for driving the recording medium, the control over the driving means can be improved in its response speed and the tracking operation also can be improved in its building-up characteristic at the time of switch-over from one recording medium driving speed to another. The invention, therefore, gives a great advantage to the automatic tracking device of the kind described.

What I claim:

1. In a reproducing apparatus having reproducing head means for reproducing signals from elongated signal tracks of a record bearing medium and drive means for driving the medium at give speeds, an automatic tracking control device for controlling the tracking of said head means relative to the track of the medium, comprising:
   (A) moving means for moving said head means in directions lateral to the track of the medium;
   (B) tracking error detection means responsive to said head means for forming a tracking error signal indicating a tracking error of said head means with respect to the tracks of the medium;
   (C) pattern signal generation means for generating a pattern signal for causing the tracing direction of the head means on the medium to coincide with the elongated direction of the tracks on the basis of the speed the drive means drives the medium;
   (D) mixing means for mixing the tracking error signal and the pattern signal to produce a mixed signal;
   (E) first control means for controlling said moving means with the mixed signal; and
   (F) second control means for controlling said drive means by using said tracking error signal.

2. In a reproducing apparatus having reproducing head means for reproducing signals from elongated signal tracks of a record bearing medium and drive means for driving the medium at given speeds, an automatic tracking control device for controlling the tracking of said head means relative to the track of the medium, comprising:
   (A) moving means for moving said head means in directions lateral to the track of the medium;
   (B) tracking error detection means responsive to said head means for forming a tracking error signal indicating a tracking error of said head means with respect to the tracks of the medium;
   (C) pattern signal generation means for generating a pattern signal for causing the tracing direction of the head means on the medium to coincide with the elongated direction of the tracks on the basis of the speed the drive means drives the medium;
   (D) mixing means for mixing the tracking error signal and the pattern signal to produce a mixed signal;
   (E) first control means for controlling said moving means with the mixed signal;
   (F) control signal forming means for forming a control signal on the basis of said mixed signal corresponding substantially to a neutral position in a movement range of said head means moved by said moving means; and
   (G) second control means for controlling said drive means on the basis of said control signal formed by said control signal forming means.

3. The device according to claim 2, wherein said control signal forming means includes:
   a sample and hold circuit for sampling and holding said mixed signal to form said control signal; and
   a sampling control circuit for causing said sample and hold circuit to sample and hold the mixed signal at a timing corresponding substantially to the neutral position in the movement range of said head means when the head means is moved by said moving means.

4. The device according to claim 3, wherein said control signal forming means further includes:
   a level adjusting circuit for adjusting the level of the signal sampled and held by said sample and hold circuit to provide said control signal.

5. The device according to claim 2, wherein said pattern signal is a saw-tooth like signal having a slope and the slope of the signal is determined by the speed at which said drive means drives the medium.

6. The device according to claim 5, wherein said head means includes at least one rotating head, and the timing for changing the slope of the pattern signal is determined by the rotating phase of said rotating head.

7. The device according to claim 2, wherein the tracks are recorded with a pilot signal for controlling the tracking, and said tracking error detection means forms the tracking error signal by using the pilot signal reproduced by said head means.

8. The device according to claim 7, wherein the tracks are recorded with four kinds of pilots signals having different frequencies, one on one track after another on another track.

9. The device according to claim 2, wherein said medium is a magnetic tape and the track is recorded with video signals.

10. The device according to claim 2, wherein said moving means includes at least one piezo-electric bimorph.

* * * * *